(12) United States Patent
Berton et al.

(10) Patent No.: US 10,109,985 B2
(45) Date of Patent: Oct. 23, 2018

(54) SEMICONDUCTOR IGNITER PLUG FOR AN AIRCRAFT TURBOMACHINE, COMPRISING SCOOPS FOR DISCHARGING POSSIBLE FUEL RESIDUES

(71) Applicant: SAFRAN AIRCRAFT ENGINES, Paris (FR)

(72) Inventors: Joel Yvan Marcel Robert Berton, Hericy (FR); Sebastien Alain Christophe Bourgois, Saint Germain les Corbeil (FR); Jean-Michel Jacques Campion, Moisenay (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 590 days.

(21) Appl. No.: 14/609,533

(22) Filed: Jan. 30, 2015

(65) Prior Publication Data
US 2015/0222097 A1 Aug. 6, 2015

(30) Foreign Application Priority Data
Feb. 3, 2014 (FR) ..................... 14 50816

(51) Int. Cl.
*H01T 13/32* (2006.01)
*F02C 7/266* (2006.01)
(Continued)

(52) U.S. Cl.
CPC .............. *H01T 13/32* (2013.01); *F02C 7/266* (2013.01); *F05D 2240/91* (2013.01);
(Continued)

(58) Field of Classification Search
CPC ..... H01T 13/14; H01T 13/32; F05D 2260/99; F05D 2260/607; F02C 7/266
(Continued)

(56) References Cited

U.S. PATENT DOCUMENTS 2,205,196 A * 6/1940 Harper, Jr. .............. H01T 13/32
165/185
3,958,144 A * 5/1976 Franks .................... H01T 13/14
313/118

(Continued)

FOREIGN PATENT DOCUMENTS

| FR | 2 926 329 A1 | 7/2009 |
|----|--------------|--------|
| FR | 2 960 913 | 12/2011 |
| FR | 2 980 575 | 3/2013 |

OTHER PUBLICATIONS

U.S. Appl. No. 13/255,772, filed Oct. 19, 2011, 2012/0055164 A1, Sebastien A. Bourgois et al.
(Continued)

*Primary Examiner* — Gerald L Sung
*Assistant Examiner* — William Breazeal
(74) *Attorney, Agent, or Firm* — Oblon, McClelland, Maier & Neustadt, L.L.P.

(57) ABSTRACT

An igniter plug for an aircraft turbomachine includes an external electrode, an internal electrode, as well as a semi-conducting body arranged between the external electrode and the internal electrode and set back from these electrodes so as to define an electrical arc forming cavity, the bottom of which is formed by an axial end surface of the semiconducting body. The free end of the external electrode is equipped with at least one scoop for discharging possible fuel residues present in the cavity.

9 Claims, 4 Drawing Sheets

(51) Int. Cl.
*H01T 13/14* (2006.01)
*H01T 13/52* (2006.01)

(52) U.S. Cl.
CPC ........ *F05D 2260/607* (2013.01); *H01T 13/14* (2013.01); *H01T 13/52* (2013.01); *Y02T 50/675* (2013.01)

(58) Field of Classification Search
USPC ............ 174/650, 137 R, 138 S, 397, 32, 350
See application file for complete search history.

(56) References Cited

U.S. PATENT DOCUMENTS

| | | | | |
|---|---|---|---|---|
| 4,973,877 | A * | 11/1990 | Suzuki | H01T 13/52 313/131 A |
| 5,349,814 | A * | 9/1994 | Ciokajlo | F02C 7/262 60/226.1 |
| 5,633,557 | A | 5/1997 | Lindsay | |
| 2008/0019822 | A1* | 1/2008 | Grammel | F02K 3/10 415/115 |
| 2012/0047899 | A1 | 3/2012 | Bourgois et al. | |
| 2012/0055164 | A1 | 3/2012 | Bourgois et al. | |

OTHER PUBLICATIONS

U.S. Appl. No. 13/266,516, filed Oct. 27, 2011, 2012/0047899 A1, Sebastien A. Bourgois et al.
U.S. Appl. No. 14/353,966, filed Apr. 24, 2014, Sebastien A. Bourgois et al.
French Preliminary Search Report dated Dec. 15, 2014 in French Application 14 50816, filed on Feb. 3, 2014 (with English Translation of Categories of Cited Documents).

* cited by examiner

SEMICONDUCTOR IGNITER PLUG FOR AN AIRCRAFT TURBOMACHINE, COMPRISING SCOOPS FOR DISCHARGING POSSIBLE FUEL RESIDUES

TECHNICAL FIELD

The invention relates to the field of igniter plugs for an aircraft turbomachine, and more precisely to semiconductor plugs. It relates to plugs for combustion chambers, as well as plugs for post-combustion modules.

The invention is applicable to any type of turbomachine, in particular to turbojet and turboprops.

STATE OF PRIOR ART

Because of their ability to generate a spark in a pressurized environment, semiconductor plugs are increasingly used for aircraft turbomachines. Such semiconductor plugs are for example known from documents FR 2 926 329, FR 2 960 913 and FR 2 980 575.

Conventionally, a semiconducting body is made by sintering minerals, to result in an agglomerate which has electrical conduction properties under a high voltage. This body is accommodated between a metal internal electrode called a central electrode, and a metal external electrode called a ground electrode. The semiconducting body is set back from the internal and external electrodes, so as to define an electric arc forming cavity. The bottom of this cavity is formed by an axial end surface of the semiconducting body. By virtue of the set back of this semiconducting body and the squeezing of the electric arc against the axial end surface of the same body, the arc blow risks, by the stream and the pressure of the air/fuel mixture inside the turbomachine are strongly reduced.

However, during wet running or in the fuel injection phase, before exciting the plug, the fuel can wet, or even fill the aforesaid cavity located at the plug nose. This instance is likely to occur in particular when the plug is vertically oriented or weakly tilted to the vertical, with the cavity opened upwards. Indeed, this causes fuel residues to be retained by gravity in this cavity. This problematic plug orientation is yet the one often favoured, because by being substantially vertically oriented and mounted in the proximity of a low point of the turbomachine, the plug accessibility is facilitated for maintenance operations. However that may be, even in other plug orientations, the cavity is likely to be wet by fuel residues adhering by capillarity to the semiconducting body.

Since the fuel is electrically insulating, filling the cavity can prevent the electric arc from being formed or hinder the squeezing thereof at the surface of the semiconducting body and cause its blowing. At shutdown, when the plug is hot, the presence of fuel residues in the cavity can cause coke formation at the surface of the semiconducting body. This coke, being electrically conductive, can lead to plug malfunctions, for example a plug short-circuiting or a wrong squeezing of the arc at the surface of the semiconducting body.

Upon exciting the plug, the energy delivered attempts to break down the same. If the breakdown is hindered or disturbed by these fuel residues, the energy will take the shortest path to cause the breakdown.

Even so, breakdowns sometimes successful in the fuel residues generate a shock wave at the surface of the semiconductor, which cracks or ruptures the same. If the very structure of the semiconducting body is heterogeneous, the energy may happen to force its way through the semiconducting body, which can result in piercing of the latter.

Thus, there is a need for optimizing design of igniter plugs, for equipping a combustion chamber as well as a post-combustion module of an aircraft turbomachine.

DISCLOSURE OF THE INVENTION

The invention aims at solving at least partially the problems met in the solutions of prior art, which are described above.

For this, one objet of the invention is to provide an igniter plug for an aircraft turbomachine, including a nose comprising an external electrode, an internal electrode, as well as a semiconducting body arranged between the external electrode and the internal electrode and set back from a free end of the external electrode and a free end of the internal electrode, so as to define an electric arc forming cavity the bottom of which is formed by an axial end surface of the semiconducting body.

According to the invention, the end of the external electrode is equipped with at least one scoop for discharging possible fuel residues present in said cavity, said discharging scoop being made by a notch opening at least onto an axial end surface of the external electrode, said notch extending between a first end leading into said cavity, and a second end opposite the first one.

The presence of one or more discharging scoops advantageously enables the possible fuel residues to be extracted from the cavity, by gravity and/or using the stream fitting closely the plug nose, in use. By limiting/avoiding filling of the cavity, the coke formation and plug malfunction risks are strongly reduced, and its lifetime is lengthened.

The invention has at least one of the following optional characteristics, taken singly or in combination.

Said notch also opens onto an outer side surface of the external electrode, and said second end of the notch is located on said outer side surface.

The first end leading into said cavity and the second end are offset from one another along a circumferential direction of the plug. This offset in the circumferential direction allows discharge of fuel residues to be facilitated, when they intend to be sucked by the stream fitting closely the plug.

Said discharging scoop has, at least in its part opening onto the outer side surface of the external electrode, a depth decreasing to its second end. This specificity also promotes discharge of fuel residues by the second end of the scoop.

At its first end, the discharging scoop has a bottom set back from the axial end surface of the semiconducting body, over a setback distance of about 0.5 to 1.5 mm, and preferably in the order of 1 mm which corresponds to the generally accepted wear of the axial surface of the semiconducting body.

Preferably, the plug includes several discharging scoops.

For example, the plug includes two discharging scoops arranged in a diametrically opposed way on the external electrode, the offset direction along the circumferential direction between the first end and the second end being different for both discharging scoops. This example is applicable in particular to the case where the plug is intended to be attached in a determined angular position on the turbomachine, along its longitudinal axis. Indeed, it is then preferentially contemplated to provide both scoops such that once the plug is mounted, the dummy diameter which connects these two scoops is substantially orthogonal to a main flow direction of the stream fitting closely the plug, in use. Thus, both scoops each can, because of the offset they have between their first and second ends, be oriented in the stream direction and promote extracting the fuel residues from the cavity.

According to another example, the plug includes a number of discharging scoops strictly greater than two, for example three, evenly distributed on the external electrode along the circumferential direction, the offset direction along the circumferential direction between the first end and the second end being identical for each of the discharging scoops. This example is applicable in particular to another case where the angular position of the plug, along its longitudinal axis, cannot be predetermined. This is for example the solution wherein the assembly of the plug, onto the turbomachine, is made through screwing. In this instance, regardless of the angular position obtained after assembling the plug, at least one of these scoops has an offset between its first and second ends which enables it to be oriented in the stream direction, thus promoting extraction of fuel residues from the cavity. In other words, in the case of a screwed plug, preferentially at least three identical scoops having a same offset direction between the ends are implemented; such that at least one of these scoops is efficient.

The external electrode has a smooth or fluted outer side surface. The flutes here form air passageways, useful for cooling reasons. Still in the case of a fluted surface, each discharging scoop can be provided between two flutes and/or through one or more flutes.

One object of the invention is also a combustion chamber for an aircraft turbomachine, including at least one such igniter plug.

One object of the invention is also a post-combustion module for an aircraft turbomachine, including at least one such igniter plug.

Finally, one object of the invention is an aircraft turbomachine comprising at least one such igniter plug and/or such combustion chamber and/or such post-combustion module.

Further advantages and characteristics of the invention will appear in the detailed non-limiting description below.

BRIEF DESCRIPTION OF THE DRAWINGS

This description will be made with regard to the appended drawings wherein.

DETAILED DESCRIPTION OF PARTICULAR EMBODIMENTS

Figure 1:
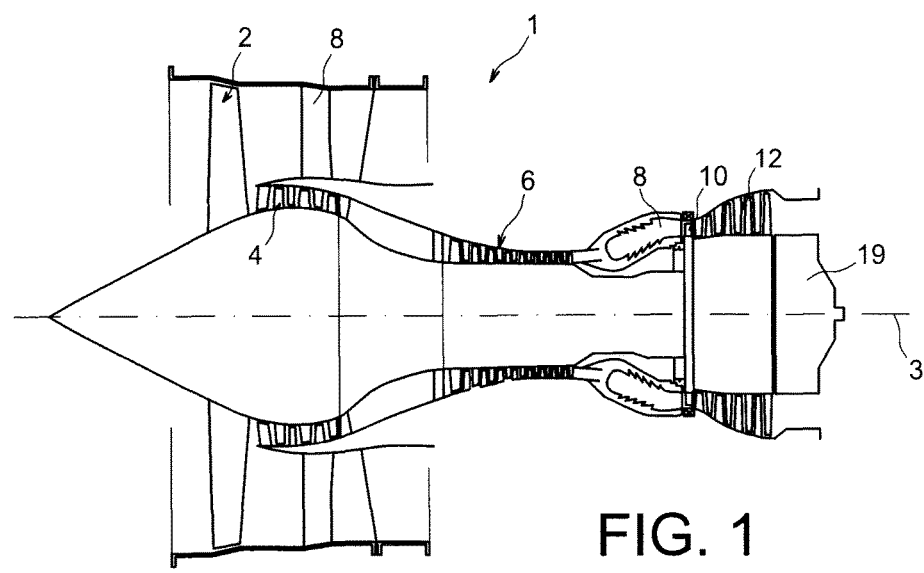
FIG. 1 represents a schematic longitudinal cross-section view of a turbomachine, according to a preferred embodiment of the invention.

First in reference to FIG. 1, an aircraft turbomachine 1 is represented, according to a preferred embodiment of the invention. This is here a two spool turbofan. However, it could be a turbomachine of another type, for example a turboprop, without departing from the scope of the invention.

The turbomachine 1 has a longitudinal axis 3 about which its different components extend. It comprises, from upstream to downstream according to a main flow direction of the gases through this turbomachine, a fan 2, a low pressure compressor 4, a high pressure compressor 6, a combustion chamber 8, a high pressure turbine 10 and a low pressure turbine 12.

Figure 2:
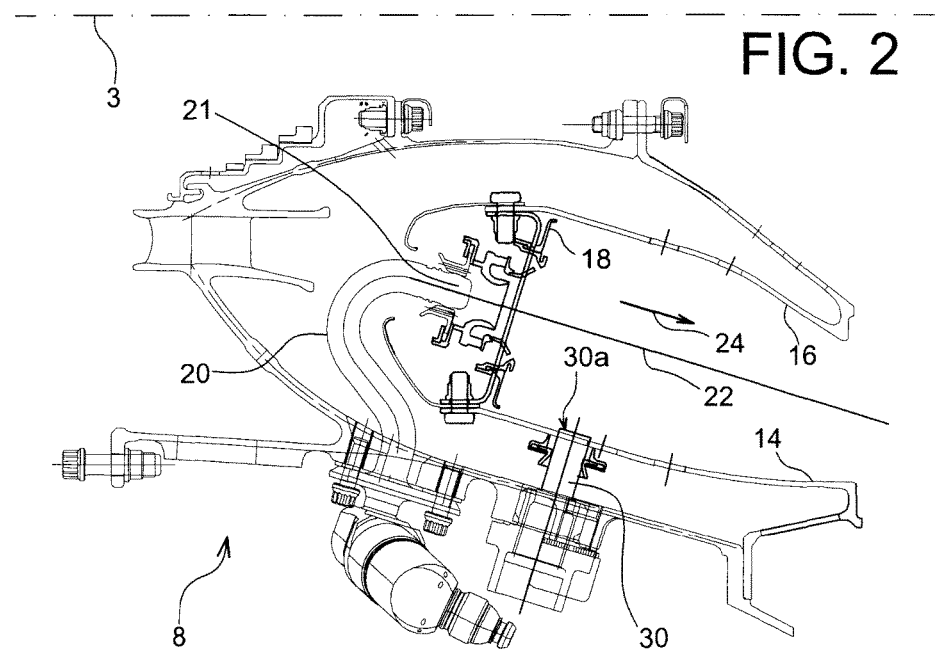
FIG. 2 represents a longitudinal cross-section of view of the combustion chamber of the turbomachine shown in the preceding figure.

Part of the combustion chamber 8 is reproduced in more details in FIG. 2. It has in particular an external shroud 14 centred on the axis 3, an internal shroud 16 also centred on the same axis, and a chamber bottom 18 connecting both shrouds at their upstream ends. Fuel injectors 20 are evenly distributed on the chamber bottom, along the circumferential direction (a single injector being visible in FIG. 2). Each of them has an injector nose 21, oriented along a mains axis 22 slightly tilted in relation to the axis 3. In this regard, it is indicated that this axis 22 is parallel to the main flow direction of the stream 24 through the chamber. During the fuel injection phase, before exciting the plug which will be described hereinafter, this stream 24 corresponds to an air and fuel mixture. It is besides noted that the stream 24 consists of air only in dry running, run down at engine shutdown or in flight before relighting, at start-up before injection.

The combustion chamber is thus equipped with one or more igniter plugs 30, specific to the invention. In FIG. 2, a single igniter plug is shown, of the type having a semiconducting body. The plug 30 is mounted on the external shroud 14, by being substantially orthogonal to the main flow direction of the stream 24. As has been represented in FIG. 2, the igniter plug 30 is preferably mounted on or in the proximity of a low point of the turbomachine, to facilitate its accessibility to operators. Thus, the plug nose 30a, accommodated within the chamber between both its walls 14, 16, is oriented upwards, as has also been represented in FIGS. 3 to 6.

Figure 3:
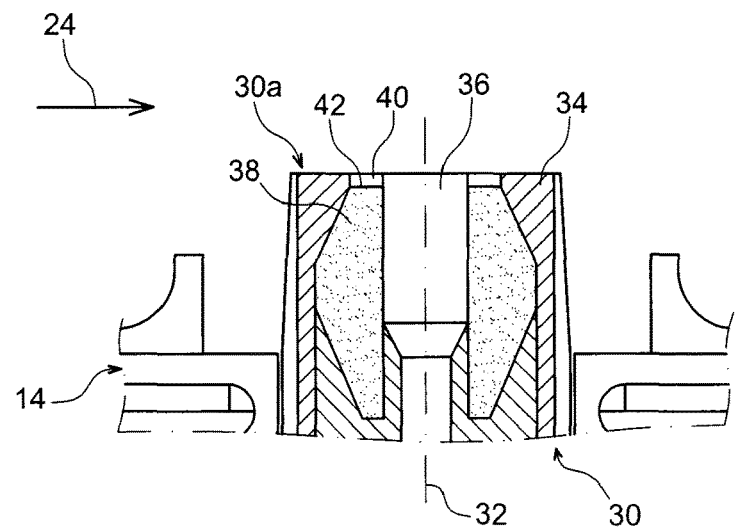
FIG. 3 represents a cross-section view of a part of an igniter plug according to a preferred embodiment of the invention, the plug equipping the combustion chamber shown in the preceding figure, this figure corresponding to a cross-section view taken along line III-III of FIG. 4.
Figure 4:
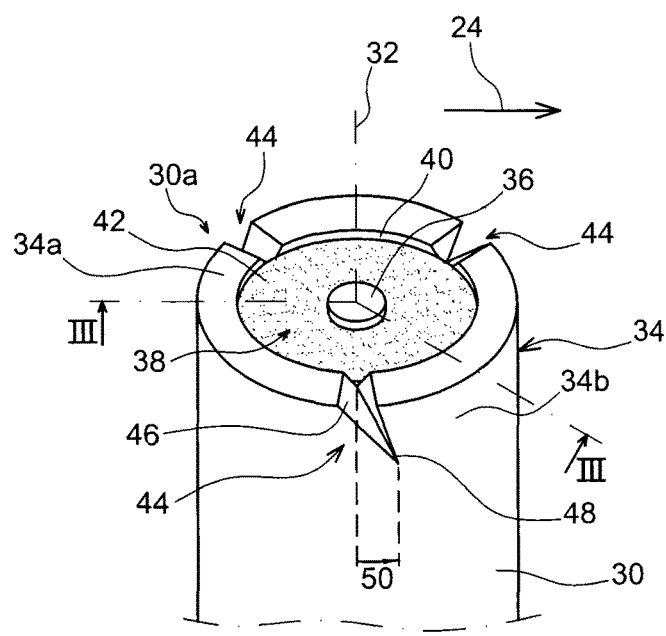
FIG. 4 represents a perspective view of a part of the plug shown in FIG. 3.
Figure 5:
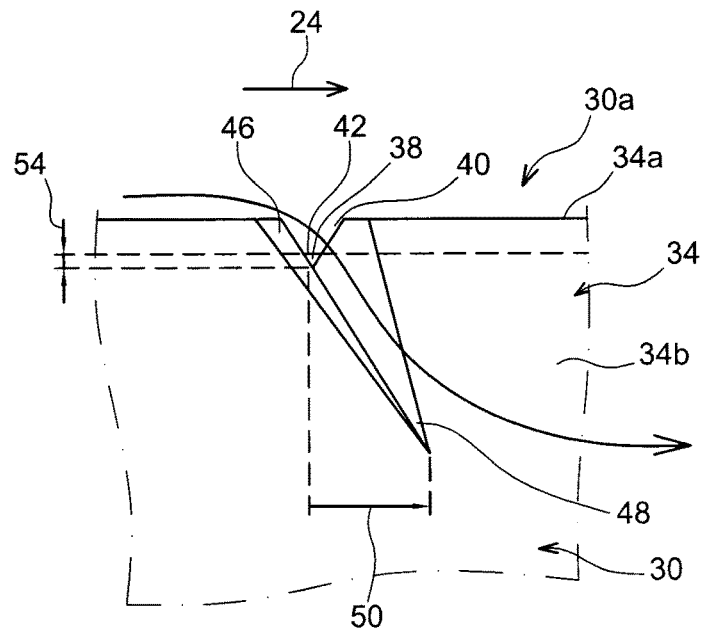
FIG. 5 represents the plug shown in FIGS. 3 and 4, along a side view.
Figure 6:
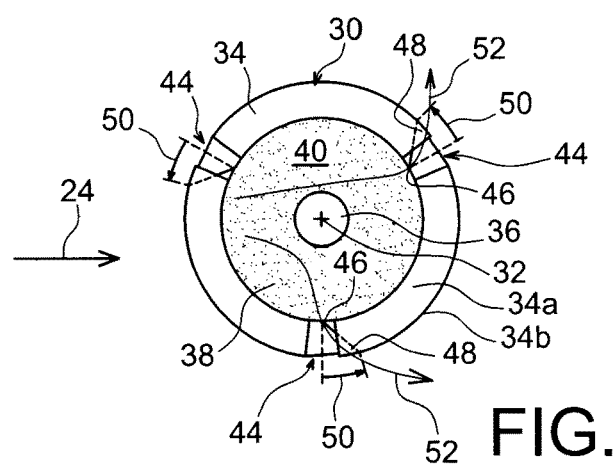
FIG. 6 represents the plug shown in FIGS. 3 to 5, along a top view.

In these FIGURES, the design of the igniter plug 30 has been detailed. It extends along a longitudinal axis 32, which is thus substantially orthogonal to the main flow direction of the stream 24. The elements making it up are essentially of revolutionary shapes centred on this axis 32. Among these elements, it is contemplated a metal external electrode 34 or ground electrode, in the general form of a shroud or hollow sheath. The external surface of this electrode 34 is fluted as shown in FIG. 3, or smooth as shown in FIG. 4. Also contemplated is a metal internal electrode 36 or centre electrode, in the form of a cylinder having preferably a circular cross-section. At the plug nose 30a, the plug includes a semiconducting body 38 arranged between the external electrode 34 and the internal electrode 36. This body 38 is slightly set back from a free end of the external electrode and a free end of the internal electrode. By way of indicating example, the setback can be of the order of a few millimetres. Thus, the three elements 34, 36, 38 define an arc electric forming cavity 40, the bottom of which is formed by an axial end surface 42 of the semiconducting body, and both concentric side surfaces of which are respectively formed by the electrode 34 and the electrode 36. Because of the presence of this cavity 40, preferably in a generally annular shape, the electric arc squeezed against the axial end surface 42 of the body is protected from the pressurized stream of the air/fuel mixture inside the combustion chamber. The arc blow risks are thus restricted.

On the other hand, because of the orientation of the cavity 40 opened upwards, fuel residues are likely to stagnate in this cavity. To restrict/prevent this effect that may have detrimental consequences on the operation of the plug and its lifetime, the invention cleverly contemplates to equip the end of the external electrode 34 with at least one scoop 44 for discharging these possible fuel residues, likely to stagnate in the cavity 40. In principle, the discharging scoops 44 enable the possible fuel residues to be extracted from the cavity 44, by gravity and/or using the stream 24 fitting closely the plug nose, in use.

In the first preferred embodiment, three discharging scoops 44, distributed over 120° about the axis 32 are provided. Each of these scoops 44 is made by a notch, for example obtained using cutting planes tilted in relation to each other. Each notch 44 passes through and extends on either side of a junction circular ridge between and axial end surface 34a of the external electrode 34, and the cylindrical outer side surface 34b of this electrode 34. Thus, the notch 44 includes a first end 46 or inner radial end leading into the cavity 40, as well as a second end 48 or outer radial end, opposite the first one. The second end 48, arranged on the cylindrical outer side surface 34b of the electrode 34, is offset from the first end 46 along a circumferential direction of the plug. This offset is schematized by the arrows 50 in FIGS. 4 to 6. It is in the same direction for the three scoops, that is counter-clockwise direction in the FIGURES concerned. With this offset, each discharging scoop 44 assumes a so-called axially tilted, helicoidal shape, or as a "comma".

This arrangement is applicable in particular to the case where the angular position of the plug 30, along its axis 32, cannot be predetermined before it is mounted on the external wall of the chamber. This is for example a solution wherein the assembly of the plug is performed through screwing. In this instance, regardless of the angular position obtained after screwing the plug 30, at least one of the scoops 44 has an offset between its first and second ends 46, 48, which enables it to be oriented in the stream direction, thus promoting extraction of fuel residues from the cavity 40. By way of example, in the position of FIG. 6, both scoops 44 which are located most downstream of the stream 24 are oriented in the flow direction of this stream, since the second end 48 is located more downstream than the first end 46. Thus, when passing around the plug 30, this stream 24 sucks the fuel residues from the cavity 40, by driving them by both downstream scoops 44. The residues can then escape from the second ends 48, as has been schematized by the arrows 52 in FIG. 6.

To promote this discharge, it is contemplated that at least in its part opening onto the outer side surface 34b, each discharging scoop 44 has a depth decreasing to the second end 48, to reach an almost null depth thereat. This indeed restricts the risks of fuel residues being trapped in the scoops, before being extracted therefrom.

In this regard, it is indicated that at its first end 46, each discharging scoop 44 has a bottom set back from the axial end surface 42 of the semiconducting body 38. The setback distance 54, schematized in FIG. 5, corresponds to the generally tolerated wear level for the semiconducting body 38, that is in the order of 1 mm. The global depth of the scoops 44 at their first end 46 thus corresponds to this set back distance 54 to which is added the depth of the cavity 40 for protecting the electric arc.

Figure 7:
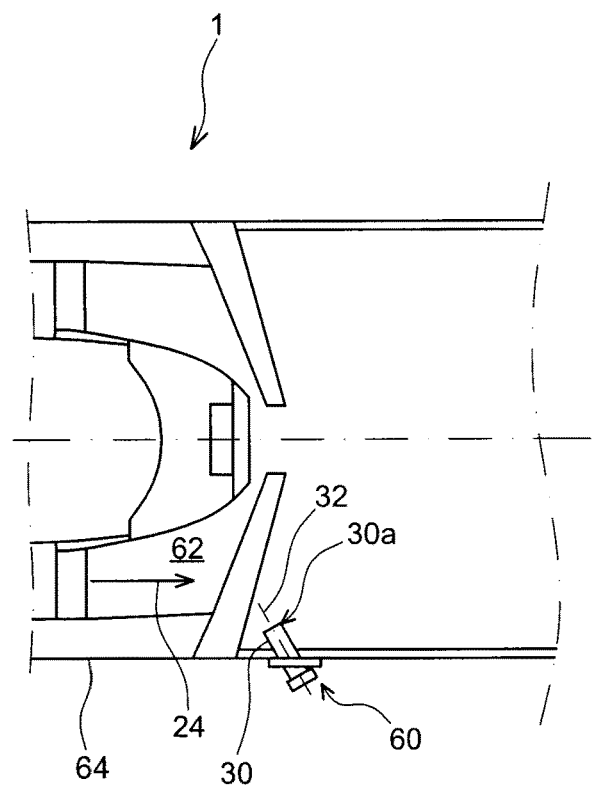
FIG. 7 is a cross-section view of an aircraft turbomachine, comprising a post-combustion module equipped with at least one plug according to another preferred embodiment of the invention.
Figure 8:
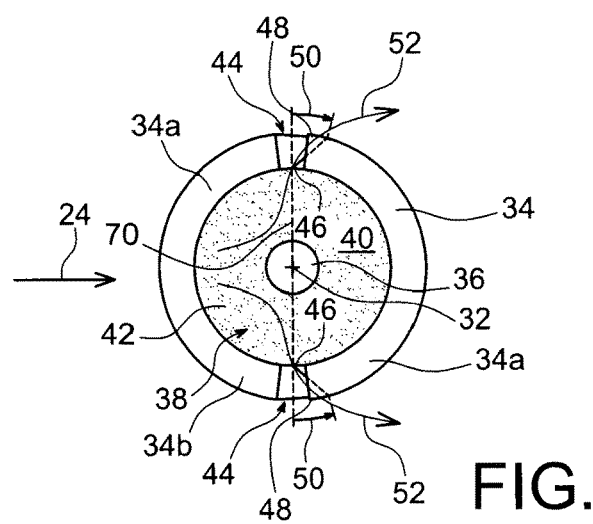
FIG. 8 is a top view of the plug equipping the post-combustion module of the turbomachine shown in the preceding figure.

In reference now to FIGS. 7 and 8, another application of the invention is shown. This is a turbomachine 1 including a post-combustion module 60, which comprises in particular a post-combustion channel 62 wherein one or more plugs 30 according to the invention are inserted. Conventionally, these plugs 30 enable the post-combustion or reheat to be ignited, which is known per se to those skilled in the art and which will thus not be further described. In the example represented in FIG. 7, the igniter plug 30 is arranged substantially vertically and mounted on or in the proximity of the low point of the turbomachine, on a wall 64 for bounding the post-combustion channel 62. The plug 30 is thus once again arranged such that its nose 30a is oriented upwards, with its cavity 40 likely to retain fuel residues. To restrict/prevent this phenomenon, the plug 30 also integrates discharging scoops 44 peculiar to the invention. They are herein in the number of two, preferably diametrically opposed on the external electrode 34.

Indeed, in reference to FIG. 8, the plug 30 thus includes two scoops 44 arranged in a diametrically opposed way on the external electrode, and the offset direction of which along the circumferential direction between the first end 46 and the second end 48 is different for both scoops 44. Actually, in FIG. 8, the scoop 44 present at the top of the figure contemplates an offset 50 in the clockwise direction, whereas the scoop 44 present at the bottom of the figure contemplates an offset 50 in the counter clockwise direction. This example is preferably applicable to the case where the plug 30 is intended to be attached in a determined angular position onto the wall 64, along its longitudinal axis 32. It is then preferentially contemplated to provide both scoops 44 such that once the plug 30 is mounted to its associated wall 64, the dummy diameter 70 which connects these two scoops is substantially orthogonal to the main flow direction of this stream 24, as has been schematized in FIG. 8.

Thus, upon passing around the plug 30, this stream 24 sucks the fuel residues off the cavity 40, by driving them by both scoops 44 both oriented in the stream direction. The residues can then escape by the second ends 48, as has been schematized by the arrows 52 in FIG. 6.

Of course, various modifications can be provided by those skilled in the art to the invention just described without departing from the scope of disclosure of the invention. In particular, the configuration of the plug nose 30a represented in FIGS. 7 and 8, which is for the post-combustion module, could be used within the combustion chamber 8, and conversely.

The invention claimed is:

1. An igniter plug for an aircraft turbomachine, comprising:
   a nose comprising an external electrode, an internal electrode, and a semiconducting body arranged between the external electrode and the internal electrode and set axially back along a longitudinal axis of the igniter plug from a free end of the external electrode and a free end of the internal electrode, so as to define an electric arc forming cavity, a bottom of the electric arc forming cavity being formed by an axially forward end surface of the semiconducting body,
   wherein the free end of the external electrode is equipped with a first notch for discharging possible fuel residue present in said electric arc forming cavity, said first notch extending axially back from an axially forward end surface of the external electrode to a first notch bottom set axially back from the axially forward end surface of the external electrode, and said first notch extending from a radially inner surface of the free end of the external electrode bounding said electric arc forming cavity to a radially outer surface of the free end of the external electrode, wherein a radially inner end of the first notch bottom is circumferentially offset, in a first circumferential direction, from a radially outer end of the first notch bottom.

2. The igniter plug according to claim 1, wherein said first notch has, an axial depth decreasing from the radially outer surface of the free end of the external electrode to the radially inner surface of the free end of the external electrode.

3. The igniter plug according to claim 1, wherein the radially inner end of the first notch bottom is set axially back from the axially forward end surface of the semiconducting body, over a setback distance of 0.5 to 1.5 mm.

4. The igniter plug according to claim 1, wherein the radially inner end of the first notch bottom is set axially back from the axially forward end surface of the semiconducting body, over a setback distance of 0.5 to 1.5 mm, wherein the free end of the external electrode includes a second notch arranged radially opposite the first notch, said second notch extending axially back from the axially forward end surface of the external electrode to a second notch bottom set axially back from the axially forward end surface of the external electrode, and said second notch extending from the radially inner surface of the free end of the external electrode bounding said electric arc forming cavity to the radially outer surface of the free end of the external electrode, wherein a radially inner end of the second notch bottom is circumferentially offset, in a second circumferential direction opposite the first circumferential direction, from a radially outer end of the second notch bottom, or the free end of the external electrode includes two or more additional notches forming a plurality of notches, evenly circumferentially distributed on the external electrode wherein each of said plurality of notches extends axially back from the axially forward end surface of the external electrode to a respective notch bottom set axially back from the axially forward end surface of the external electrode, and wherein each of said plurality of notches extends from the radially inner surface of the free end of the external electrode bounding said electric arc forming cavity to the radially outer surface of the free end of the external electrode, wherein a respective radially inner end of each notch bottom is circumferentially offset, in the first circumferential direction, from a respective radially outer end of each notch bottom.

5. The igniter plug according to claim 1, wherein the external electrode has a smooth or fluted outer side surface.

6. A combustion chamber for an aircraft turbomachine, comprising the igniter plug according to claim 1.

7. A post-combustion module for an aircraft turbomachine, comprising the igniter plug according to claim 1.

8. An aircraft turbomachine comprising the igniter plug according to claim 1.

9. The igniter plug according to claim 1, wherein the radially inner end of the first notch bottom is set axially back from the axially forward end surface of the semiconducting body, over a setback distance of 1 mm.

\* \* \* \* \*